(12) United States Patent
Al Sayeed et al.

(10) Patent No.: US 11,553,262 B1
(45) Date of Patent: Jan. 10, 2023

(54) RESOLVING CONTROL CONFLICTS AMONG TRUNK PROTECTION LINKS

(71) Applicant: Ciena Corporation, Hanover, MD (US)

(72) Inventors: Choudhury A. Al Sayeed, Stittsville (CA); Edward Chen, Kanata (CA); David Bownass, Ottawa (CA); Joanne Wakefield, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/507,054

(22) Filed: Oct. 21, 2021

(51) Int. Cl.
| | |
|---|---|
| *H04B 10/032* | (2013.01) |
| *H04Q 11/00* | (2006.01) |
| *H04B 10/25* | (2013.01) |

(52) U.S. Cl.
CPC ......... *H04Q 11/0067* (2013.01); *H04B 10/25* (2013.01); *H04Q 2011/0079* (2013.01)

(58) Field of Classification Search
CPC .................................................. H04B 10/032
See application file for complete search history.

(56) References Cited

U.S. PATENT DOCUMENTS

| | | | |
|---|---|---|---|
| 8,218,434 B1* | 7/2012 | Brown | ............... H04L 45/22 370/227 |
| 8,364,036 B2 | 1/2013 | Boertjes et al. | |
| 8,509,621 B2 | 8/2013 | Boertjes et al. | |
| 9,344,191 B2 | 5/2016 | Al Sayeed et al. | |
| 9,419,708 B2 | 8/2016 | Rad et al. | |
| 9,485,013 B2 | 11/2016 | Al Sayeed et al. | |
| 9,577,763 B2 | 2/2017 | Al Sayeed et al. | |
| 9,729,265 B2 | 8/2017 | Hurley et al. | |
| 9,768,902 B2 | 9/2017 | Al Sayeed et al. | |
| 9,774,392 B2 | 9/2017 | Doucet et al. | |
| 9,806,803 B2 | 12/2017 | Bownass et al. | |

(Continued)

FOREIGN PATENT DOCUMENTS

| | | |
|---|---|---|
| EP | 2 993 807 B1 | 1/2018 |
| WO | 2020/102011 A1 | 5/2020 |

OTHER PUBLICATIONS

Okamawari et al., "Optical multiplex section level protected network based on point-to-point WDM system", OFC 2000, Mar. 2000 (Year: 2000).*

(Continued)

*Primary Examiner* — Shi K Li
(74) *Attorney, Agent, or Firm* — Clements Bernard Baratta; Lawrence A. Baratta, Jr.; Christopher L. Bernard

(57) ABSTRACT

Systems and methods for resolving control conflicts in trunk protection links are provided. A method, in one implementation, includes identifying control conflicts among Network Elements (NEs) in an Optical Multiplex Section (OMS). The OMS may have a plurality of trunk protection links arranged in parallel and a plurality of Trunk Protection Switches (TPSs). Also, the trunk protection links and TPSs are configured to create a distributed 1:N trunk protection arrangement. The method also includes resolving the control conflicts by auto-negotiating a primary instance associated with enabling a first set of control actions to be conducted along a primary path in the OMS and auto-negotiating one or more follower instances associated with enabling a second set of control actions to be conducted along one or more secondary paths in the OMS subsequent to the first set of control actions.

20 Claims, 11 Drawing Sheets

(56) References Cited

U.S. PATENT DOCUMENTS

| | | |
|---|---|---|
| 9,882,634 B1 | 1/2018 | Al Sayeed et al. |
| 9,906,294 B2 | 2/2018 | Al Sayeed et al. |
| 9,918,148 B2 | 3/2018 | Swinkels et al. |
| 9,973,295 B2 | 5/2018 | Al Sayeed et al. |
| 9,985,726 B1 | 5/2018 | Al Sayeed et al. |
| 9,986,317 B1 | 5/2018 | Al Sayeed et al. |
| 10,063,313 B1 | 8/2018 | Al Sayeed et al. |
| 10,237,011 B2 | 3/2019 | Al Sayeed et al. |
| 10,361,957 B1 | 7/2019 | MacKay et al. |
| 10,439,709 B1 | 10/2019 | Al Sayeed |
| 10,536,235 B2 | 1/2020 | Al Sayeed et al. |
| 10,560,212 B2 | 2/2020 | Al Sayeed et al. |
| 10,587,339 B1 | 3/2020 | Al Sayeed et al. |
| 10,680,737 B1 | 6/2020 | Al Sayeed et al. |
| 10,686,543 B1 | 6/2020 | Al Sayeed et al. |
| 10,735,837 B1 | 8/2020 | Al Sayeed et al. |
| 10,826,601 B2 | 11/2020 | Bhatnagar et al. |
| 10,826,641 B1 | 11/2020 | Al Sayeed et al. |
| 10,833,791 B1 | 11/2020 | Al Sayeed |
| 2019/0253361 A1 | 8/2019 | MacKay et al. |
| 2020/0059315 A1 | 2/2020 | Al Sayeed et al. |
| 2020/0076499 A1 | 3/2020 | Al Sayeed et al. |

OTHER PUBLICATIONS

Park et al., "A Study on 1:N Protected WDM Systems and the Architecture of an ADM for Its Implementation", IEEE Photonics Technology Letters, vol. 10, No. 10, Oct. 1998 (Year: 1998).*

* cited by examiner

RESOLVING CONTROL CONFLICTS AMONG TRUNK PROTECTION LINKS

TECHNICAL FIELD

The present disclosure generally relates to networking systems and methods. More particularly, the present disclosure relates to resolving control conflicts among trunk protection links arranged in parallel in an Optical Multiplex Section (OMS).

BACKGROUND

Generally, a trunk cable is a fiber optic cable used in an optical communication network for transmitting photonic signals. Trunk cables may be used for terrestrial and/or submarine applications and may include any number and type of fiber optic lines. For example, some trunk cables may include dozens of optical fibers for transmitting signals within multiple channels (or wavelengths) on multiple parallel fiber paths. In some cases, the parallel paths may be used for protection (or backup) when an active fiber is faulty.

FIG. 1 is a schematic diagram illustrating a conventional trunk protection section 10 of an optical network. The trunk protection section 10 includes a channel multiplexer (mux) 12 at a section head and a channel demultiplexer (demux) 14 at a section tail. In this example, the trunk protection section 10 includes an active fiber span 16, a first backup fiber span 18, and a second backup fiber span 20. The fibers spans 16, 18, 20 are arranged in parallel.

In the conventional system, the trunk protection section 10 is limited in a number of ways. For instance, trunk protection in this case is only capable of protection with respect to a single fiber span (i.e., active fiber span 16). Also, the conventional trunk protection section 10 is constrained to the same fiber type, similar fiber losses, the same types of amplifiers on each fiber span, and the same or similar mux/demux configuration among all protection routes to ensure the same launch power and receiving spectrum. The conventional trunk protection section 10 also includes only the channel mux 12 and channel demux 14, which are fixed filters, and does not include spectrum-selective switches at the head and tail locations. Thus, there is typically little flexibility in this trunk protection section 10, which can lead to a tedious and manual setup process that will be the same for all routes. Therefore, there is a need for optical communications networks having greater flexibility for allowing variability in configurations, fiber types, etc., in the network paths, especially as a network is scaled over time with different types of components, nodes, and Network Elements (NEs).

BRIEF SUMMARY

The present disclosure is directed to systems, methods, and non-transitory computer-readable media for resolving control conflicts in a network, Optical Multiplex Section (OMS), or other similar environment, whereby control conflicts may be resolved, in particular, among trunk protection links. According to one implementation, a process for resolving control conflicts among trunk protection links may include the step of identifying one or more control conflicts among a plurality of Network Elements (NEs) during an auto-configuration procedure in an Optical Multiplex Section (OMS) having a plurality of trunk protection links arranged in parallel and a plurality of Trunk Protection Switches (TPSs). For instance, the trunk protection links and TPSs may be configured to create a distributed 1:N trunk protection arrangement. Furthermore, the process may include the step of resolving the one or more control conflicts by auto-negotiating a primary instance associated with enabling a first set of control actions to be conducted along a primary path in the OMS and auto-negotiating one or more follower instances associated with enabling a second set of control actions to be conducted along one or more secondary paths in the OMS subsequent to the first set of control actions.

In some implementations, the primary instance and the one or more follower instances may be configured to define a control sequence among the plurality of trunk protection links to ensure that power received at a tail-end of the OMS is substantially consistent and that a link budget remains uninterrupted. Also, the process may be configured to auto-negotiate the primary instance and the one or more follower instances based on path losses respectively related to one or more multiplexers and demultiplexer associated with the primary path and one or more secondary paths. Alternatively, auto-negotiating the primary instance and the one or more follower instances may be based on an output destined to be provided to a transmitter of a respective TPS or an input destined to be received from a receiver of a respective TPS.

According to some embodiments, the OMS may include a plurality of secondary paths related to a plurality of follower instances for enabling the second set of control actions. The process may also include the step of independently auto-negotiating the plurality of follower instances for each secondary path based on the configuration of each secondary path. For example, independently auto-negotiating the plurality of follower instances may include maintaining the substantially same path loss regardless of the secondary path. The process may further include compensating for fiber losses across the primary path and secondary paths by modeling the trunk protection links as logical fiber links and tracking fiber loss changes.

Furthermore, the step of auto-negotiating the one or more follower instances may include following a launch spectrum shape associated with the primary instance. The step of auto-negotiating the one or more follower instances may further include adjusting a total launch power associated with each of the one or more secondary paths. Alternatively, the step of auto-negotiating the one or more follower instances may further include deriving a launch power profile based on one or more of fiber type, fiber loss, and presence or absence of Raman amplification on the respective secondary path.

The process may also include the step of broadcasting control messages from a first node at a head-end of the OMS and to receive the control messages by a selective switch at a second node at a tail-end of the OMS. The primary path and one or more secondary paths may include one or more of different numbers of fiber spans, different fiber types, different Intermediate Line Amplifiers (ILAs), different Raman amplification strategies, different Amplified Spontaneous Emission (ASE) amplification strategies, and different fiber losses. At least one of the primary path and one or more secondary paths may include a Dynamic Gain Flattening Function (DGFF) to reduce ripples introduced by an associated amplifier in order to meet a target launch profile. Also, the step of auto-negotiating the one or more follower instances may include setting one or more of a gain actuator, loss actuator, and tilt actuator to achieve a target launch profile.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for resolving control conflicts among optical routes, such as trunk protection links. As mentioned above, conventional trunk protection systems are typically limited to protection for just a single fiber span, only one fiber type, similar fiber losses, similar amplifier specifications, and a fixed mux/demux configuration. There is no provision in these conventional systems for automatic configuration of protection routes that can have different configurations (e.g., Raman amplified fiber spans vs non-Raman amplified fiber spans), the presence of spectrum-selective switches (e.g., with or without ASE loading at the section head), different span counts in between protection routes, different fiber types, different fiber losses that could dictate different launch powers and receive spectrum expressing to a downstream node, and/or providing scalable support for network extensions or new additions of protection routes. However, the present disclosure is configured to provide more flexibility in the network setup, particularly to allow the resolution of control conflicts among trunk protection links, even in arrangements where the parallel links have different numbers of fiber spans, different fiber types, different fiber losses, different Intermediate Line Amplifiers (ILAs), links with Raman amplifiers, links without Raman amplifiers, links with Amplified Spontaneous Emission (ASE) loading, links without ASE loading, and/or other differences. Thus, this is an improvement over conventional systems, which are only capable of single fiber spans and the same configurations and specifications for the parallel links.

The disclosure herein focuses on resolving control conflicts among trunk protection optical links. An Optical Multiplex Section (OMS) have N parallel links may referred to as a 1:N trunk protection arrangement where traffic may flow from a single point at a head-end of the OMS, through one of the N parallel paths, and back to a single point at a tail-end of the OMS. In particular, 1:N trunk protection can be configured using Trunk Protection Switches (TPSs) for a single fiber span or for a plurality of fiber spans within an OMS, where each protected segment can contain a plurality of fiber spans, amplifier counts, or cascaded trunk protection sections.

Figure 1:
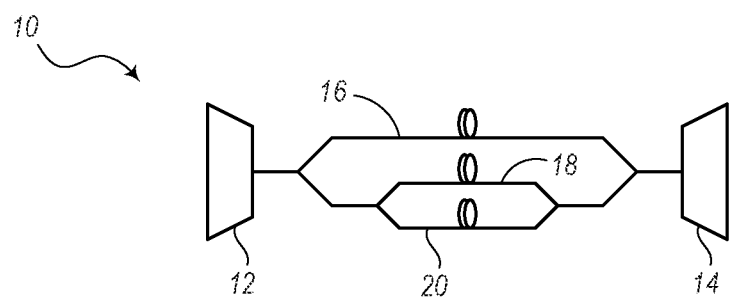
FIG. 1 is a schematic diagram illustrating a conventional trunk protection section of an optical network.
Figure 2:
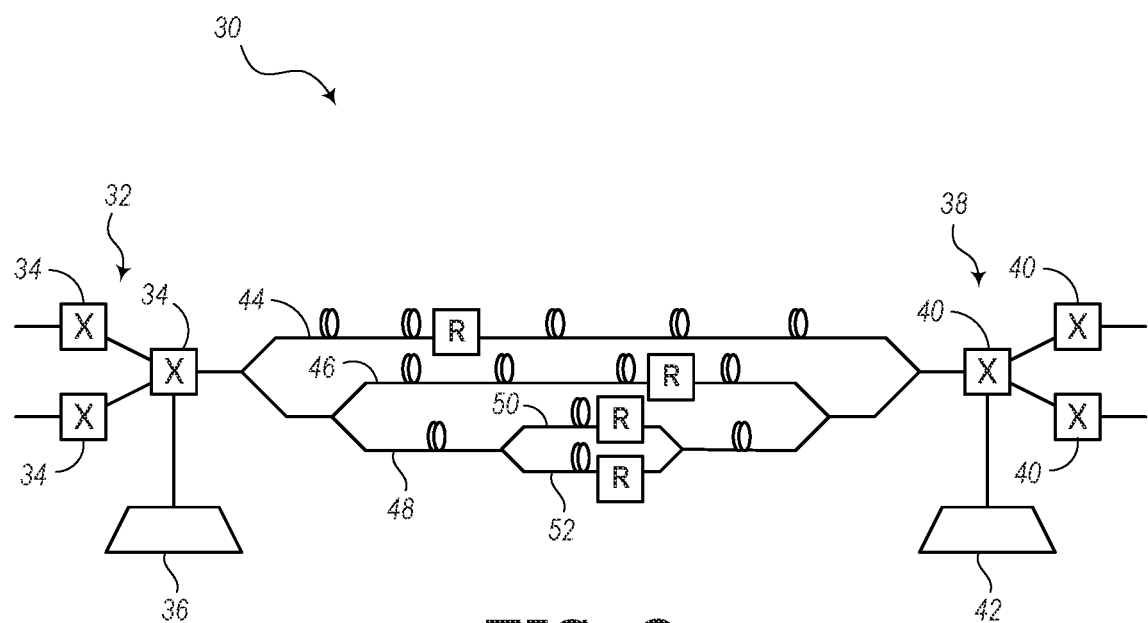
FIG. 2 is a schematic diagram showing an Optical Multiplex Section (OMS), according to various embodiments of the present disclosure.

FIG. 2 is a schematic diagram showing an embodiment of an OMS 30. In this embodiment, the OMS 30 includes a head-end 32 that may be configured as a Reconfigurable Optical Add/Drop Multiplexer (ROADM), router, switch, etc. The head-end 32 includes a number of switches 34 and a channel multiplexer/demultiplexer (mux/demux) 34. The OMS 30 also includes a tail-end 38 that may also be configured as a ROADM, router, switch, or the like. The tail-end 38 includes a number of switches 40 and a channel mux/demux 42.

The OMS 30 includes a plurality of parallel paths 44, 46, 48. In this example, one path (i.e., path 48) further includes parallel paths 50, 52. It may be noted that some paths 44, 46, 48, 50, 52 may include one or more Raman amplifiers while other may not include any Raman amplifiers. Each of the paths 44, 46, 48, 50, 52 may include any number of fiber spans.

Although not shown in FIG. 2, a TPS may be arranged at each of the intersections that lead to two different arms or branches that form two parallel paths and at each of the intersections that lead from two parallel paths back to a single line. A control device, as described below, may be used for controlling the TPSs for controlling traffic through the OMS 30. The OMS 30 may have multi-layer trunk protection links, where a TPS near the head-end 32 is configured to transmit an optical broadcast message and a TPS near the tail-end 34 is configured as a broadband optical switch for receiving the message. The message may include transmission data and/or may include control instructions for causing the controllers at each of the TPSs to switch accordingly for path routing. In other embodiments, the control message may be transmitted via a control plane that is independent of the data transmission lines (i.e., paths 44, 46, 48, 50, 52).

Conflict may arise in such configurations for controlling Network Elements (NEs) and actuators from the head-end 32 to the tail-end 38, when a plurality of protected fiber spans fan-out from a given fiber span or from the head-end 32 or converge to another fiber span or to the tail-end 38. The embodiments of the present disclosure are configured to resolve control conflicts among protected NEs during the time of auto-configuration (or auto-calibration). However, similar concepts can be extended, as would be known from an understanding of the present disclosure, for other section-level control, optimization, or recalibration activities, where control activities need to be sequenced among trunk protected links. This can be done in order to ensure the Rx power and the link budget (e.g., at or near the tail-end 38) remain uninterrupted at further downstream sections when the trunk protection kicks in from one link to other links.

The present disclosure provides several methods to derive a sequence of control actions among the protected transmit links and at the receive location during auto-calibration, where the associated network elements in a protection setup may be configured to auto-negotiate a primary instance to proceed with first control actions (e.g., calibration) and the rest follow the leads in parallel. In one implementation, the primary instance may be selected considering the highest mux or demux path losses. In another implementation, the primary instance may be selected knowing either that the output is going to a TPS transmitter (Tx) or the input is received from a TPS receiver (Rx).

Conflict Control System

Figure 3:
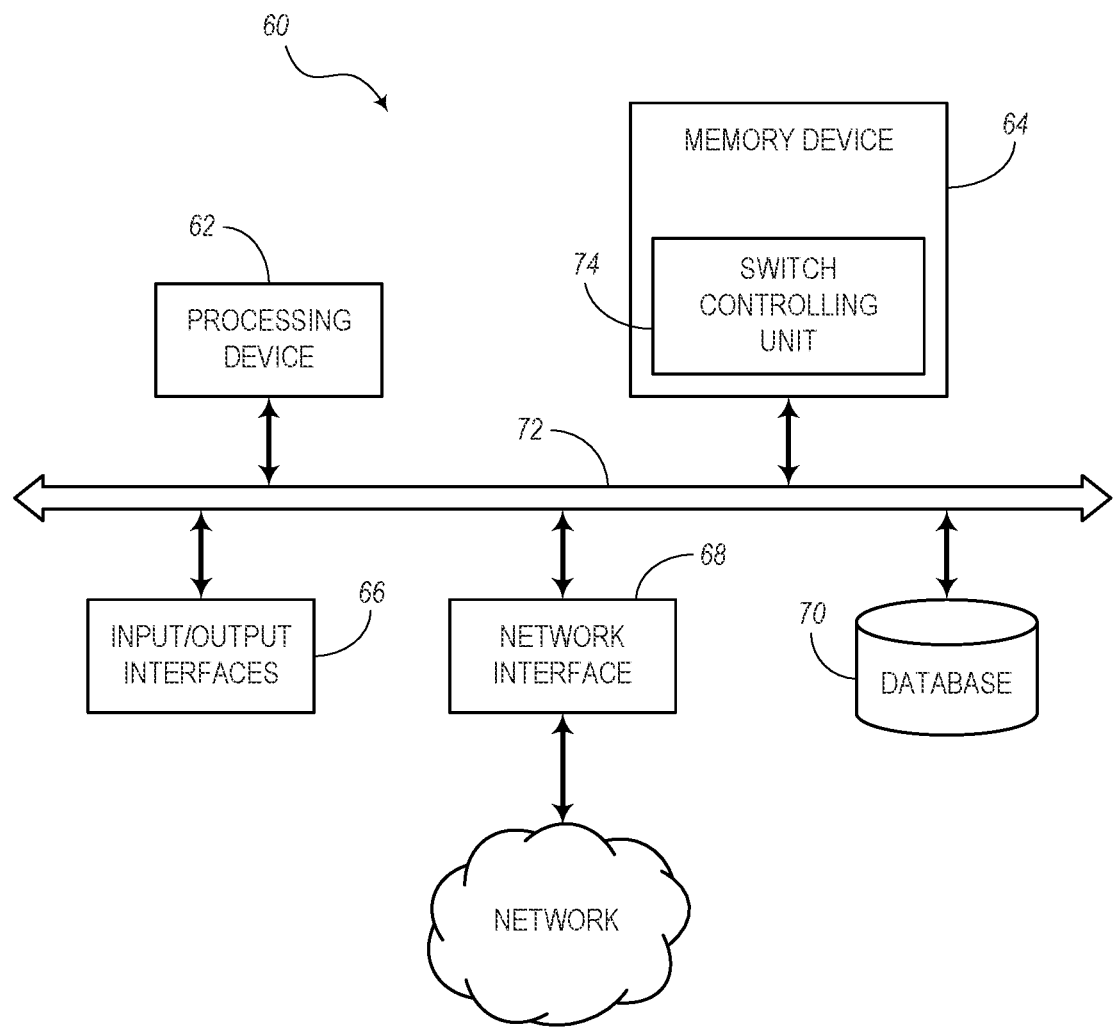
FIG. 3 is a block diagram illustrating a conflict control system for resolving control conflicts within a network, section of a network, OMS, or other suitable (optical) communication system, according to various embodiments of the present disclosure.

FIG. 3 is a block diagram illustrating an embodiment of a conflict control system 60 for resolving control conflicts within a network, section of a network, OMS (e.g., OMS 30), or other suitable (optical) communication system. In the illustrated embodiment, the conflict control system 60 may be a digital computing device that generally includes a processing device 62, a memory device 64, Input/Output (I/O) interfaces 66, a network interface 68, and a database 70. It should be appreciated that FIG. 3 depicts the conflict control system 60 in a simplified manner, where some embodiments may include additional components and suitably configured processing logic to support known or conventional operating features. The components (i.e., 62, 64, 66, 68, 70) may be communicatively coupled via a local interface 72. The local interface 72 may include, for example, one or more buses or other wired or wireless connections. The local interface 72 may also include controllers, buffers, caches, drivers, repeaters, receivers, among other elements, to enable communication. Further, the local interface 72 may include address, control, and/or data connections to enable appropriate communications among the components 62, 64, 66, 68, 70.

It should be appreciated that the processing device 62, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 62 may also include or utilize stored program instructions (e.g., stored in hardware, software, and/or firmware) for control of the conflict control system 60 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 64 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 64 may incorporate electronic, magnetic, optical, and/or other types of storage media. The memory device 64 may have a distributed architecture, where various components are situated remotely from one another, but can be accessed by the processing device 62.

The memory device 64 may include a data store, database (e.g., database 70), or the like, for storing data. In one example, the data store may be located internal to the conflict control system 60 and may include, for example, an internal hard drive connected to the local interface 72 in the conflict control system 60. Additionally, in another embodiment, the data store may be located external to the conflict control system 60 and may include, for example, an external hard drive connected to the Input/Output (I/O) interfaces 66 (e.g., SCSI or USB connection). In a further embodiment, the data store may be connected to the conflict control system 60 through a network and may include, for example, a network attached file server.

Software stored in the memory device 64 may include one or more programs, each of which may include an ordered listing of executable instructions for implementing logical functions. The software in the memory device 64 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 62), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 62 or other suitable circuitry or logic). For example, when executed, the instructions may cause or enable the processing device 62 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 62), or any suitable combination thereof. Software/firmware modules may reside in the memory device 64, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 66 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 66 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 68 may be used to enable the conflict control system 60 to communicate over a network, such as OMS 30, the Internet, a Wide Area Network (WAN), a Local Area Network (LAN), and the like. The network interface 68 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 68 may include address, control, and/or data connections to enable appropriate communications on the OMS 30.

In particular, the conflict control system 60 may include a switch controlling unit 74, which may be implemented in any suitable combination of software, firmware, or middleware (e.g., in the memory device 64) and/or hardware on the processing device 62. The switch controlling unit 74 may be stored on a non-transitory computer-readable medium, such as the memory device 64, and may include logical instructions, which, when executed, enable or cause the processing device 62 to perform a number of actions, as described throughout the present disclosure.

Figure 4:
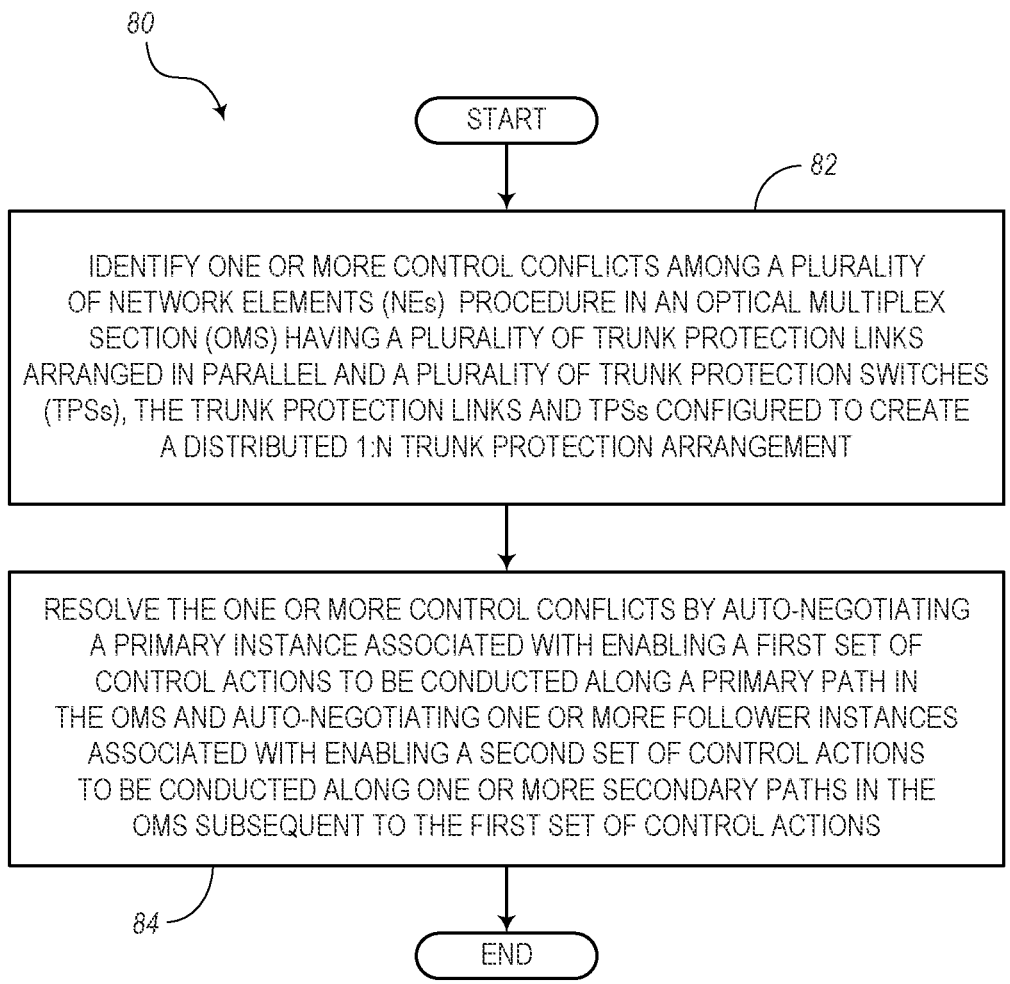
FIG. 4 is a flow diagram illustrating a process for resolving control conflicts among trunk protection links, according to various embodiments of the present disclosure.

FIG. 4 is a flow diagram illustrating an embodiment of a process 80 for resolving control conflicts among trunk protection links. For example, the process 80 may be associated with the switch controlling unit 74 shown in FIG. 3 or other executable logic for resolving control conflicts in a network, OMS, or the like. In the illustrated embodiment, the process 80 includes the step of identifying one or more control conflicts among a plurality of Network Elements (NEs) in an Optical Multiplex Section (OMS) having a plurality of trunk protection links arranged in parallel and a plurality of Trunk Protection Switches (TPSs), as indicated in block 82. For instance, the trunk protection links and TPSs may be configured to create a distributed 1:N trunk protection arrangement. Furthermore, the process 80 includes the step of resolving the one or more control conflicts by auto-negotiating a primary instance associated with enabling a first set of control actions to be conducted along a primary path in the OMS and auto-negotiating one or more follower instances associated with enabling a second set of control actions to be conducted along one or more secondary paths in the OMS subsequent to the first set of control actions, as indicated in block 84.

In some embodiments, the process 80 may further be defined whereby the primary instance and the one or more follower instances are configured to define a control sequence among the plurality of trunk protection links to ensure that power received at a tail-end of the OMS is substantially consistent and that a link budget remains uninterrupted. Also, the process 80 may auto-negotiate the primary instance and the one or more follower instances based on path losses respectively related to one or more multiplexers and demultiplexer associated with the primary path and one or more secondary paths. Alternatively, auto-negotiating the primary instance and the one or more follower instances may be based on an output destined to be provided to a transmitter of a respective TPS or an input destined to be received from a receiver of a respective TPS.

According to some embodiments, the OMS may include a plurality of secondary paths related to a plurality of follower instances for enabling the second set of control actions. The process 80 may also include the step of independently auto-negotiating the plurality of follower instances for each secondary path based on the configuration of each secondary path. For example, independently auto-negotiating the plurality of follower instances may include maintaining the substantially same path loss regardless of the secondary path. The process 80 may further include compensating for fiber losses across the primary path and secondary paths by modeling the trunk protection links as logical fiber links and tracking fiber loss changes.

Furthermore, the step of auto-negotiating the one or more follower instances may include following a launch spectrum shape associated with the primary instance. The step of auto-negotiating the one or more follower instances may further include adjusting a total launch power associated with each of the one or more secondary paths. Alternatively, the step of auto-negotiating the one or more follower instances may further include deriving a launch power profile based on one or more of fiber type, fiber loss, and presence or absence of Raman amplification on the respective secondary path.

The process 80 may also include the step of broadcasting control messages from a first node at a head-end of the OMS and to receive the control messages by a selective switch at a second node at a tail-end of the OMS. The primary path and one or more secondary paths may include one or more of different numbers of fiber spans, different fiber types, different Intermediate Line Amplifiers (ILAs), different Raman amplification strategies, different Amplified Spontaneous Emission (ASE) amplification strategies, and different fiber losses. At least one of the primary path and one or more secondary paths may include a Dynamic Gain Flattening Function (DGFF) to reduce ripples introduced by an associated amplifier in order to meet a target launch profile. Also, the step of auto-negotiating the one or more follower instances may include setting one or more of a gain actuator, loss actuator, and tilt actuator to achieve a target launch profile.

Optical Multiplex Section (OMS)

Figure 5:
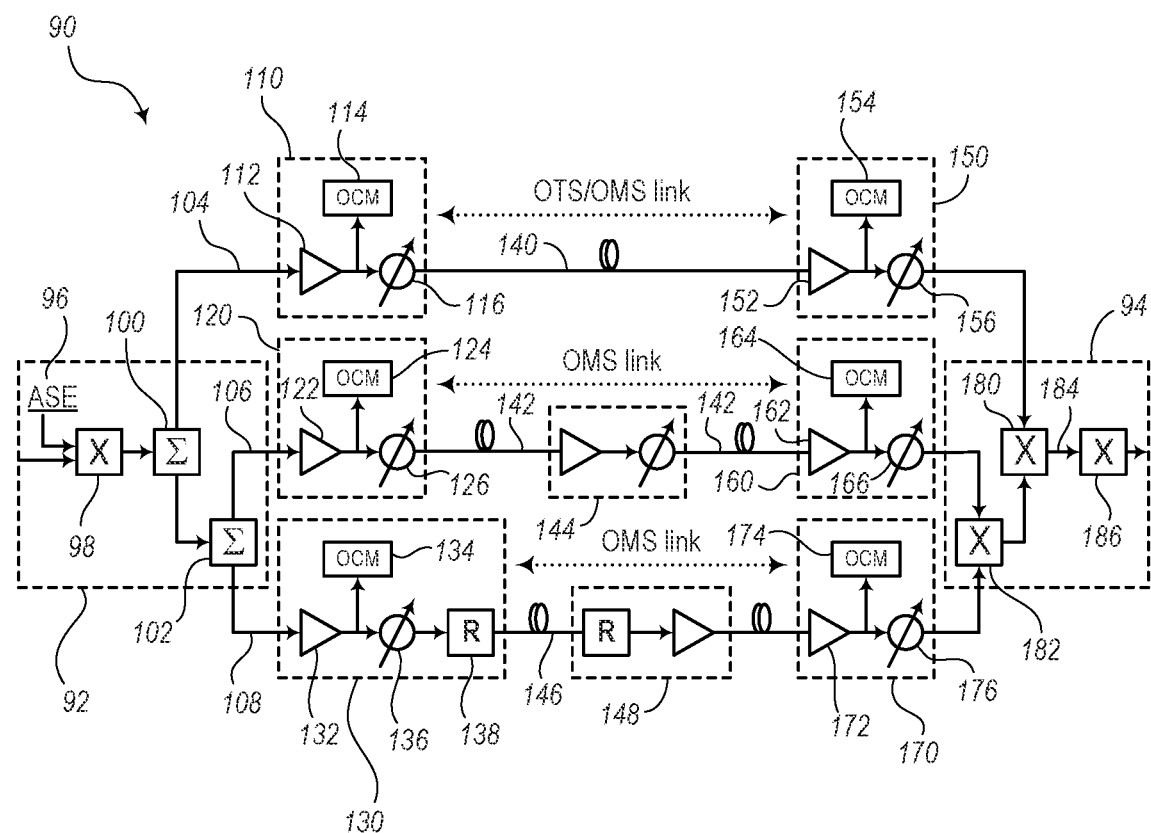
FIG. 5 is a schematic diagram of an OMS with control conflict resolution, according to various embodiments of the present disclosure.

FIG. 5 is a schematic diagram of an OMS 90 with control conflict resolution. The OMS 90 includes a head-end node 92, which may be configured on a separate shelf, and a tail-end node 94, which also may be configured on a separate shelf. The head-end node 92 may include, among other things, an Amplified Spontaneous Emission (ASE) source 96, a section-mux 98, and a first Trunk Protection Switch (TPS) 100, and a second TPS 102. It should be noted that the head-end node 92 may include any number of TPSs to enable additional branching to multiple other parallel paths. The head-end node 92 is configured to broadcast control messages along multiple parallel paths 104, 106, 108.

Path 104 of the OMS 90 leads to a first line-mux controller 110, which includes an amplifier 112, an Optical Channel Monitor (OCM) 114, and an attenuator 116 (e.g., Variable Optical Attenuator (VOA)). Path 106 leads to a second line-mux controller 120, which includes an amplifier 122, an OCM 124, and an attenuator 126 (e.g., VOA). Also, path 108 leads to a third line-mux controller 130, which includes an amplifier 132, an OCM 134, an attenuator 136 (e.g., VOA), and a Raman amplifier 138. In some embodiments, each of the first, second, and third line-mux controllers 110, 120, 130 may be arranged on different shelves.

In this embodiment, the output from the line-mux 110 leads to a fiber span 140, which may be part of an Optical Transport System (OTS) link and/or OMS link. The output from the line-mux 120 OMS 90 leads to a fiber span 142 and Intermediate Line Amplifier (ILA) 144, where the ILA 144 may include an amplifier and an attenuator. The fiber span 142 may be part of an OMS link. The output from the line-mux 130 leads to a fiber span 146 and a Raman amplifier 148. The fiber span 146 may also be part of an OMS link. In some embodiments, the ILAs 144, 148 may be arranged on different shelves.

The fiber span 140 leads to a first line-demux controller 150, which includes an amplifier 152, an OCM 154, and an attenuator 156. The fiber span 142 leads to a second line-demux controller 160, which includes an amplifier 162, an OCM 164, and an attenuator 166. The fiber span 146 leads to a third line-demux controller 170, which includes an amplifier 172, an OCM 174, and an attenuator 176. The first, second, and third line-demux controllers 150, 160, 170 may be arranged on different shelves. The outputs from the first, second, and third line-demux devices 150, 160, 170 are configured to lead to the tail-end node 94. In this example with three parallel paths, the tail-end node 94 includes two TPSs 180, 182 to combine parallel paths in cascade to a single path 184 that leads to a section-demux 186.

According to a possible objective of the embodiments of the present disclosure, 1:N trunk protection links (e.g., three links in the embodiment of FIG. 5) may be automatically calibrated, where each link is considered to be optically-filled or ASE-loaded. The trunk protection is enabled between 1:N fiber pairs with TPSs that provide a broadcast from the section-mux 98 at the head-end node 92 in a transmit direction and a selective switch or section-demux 186 at the tail-end node 94 in the receive direction.

In some embodiments, an N number (e.g., three) of TPSs can be cascaded and may be configured right after the section-mux 98 and before the section-demux 186 to provide 1:N fiber links (e.g., OTS link) or even 1:N OMS link protection, where each OMS link can have a plurality of fiber spans 140, 142, 146, whose fiber types, ILAs (e.g., ILA 144), or number of span counts can be different from others. In order to provide trunk protection, the network elements per protection link are expected to be arranged in different shelves or in different nodes. The OMS 90 may be expected to have communication among the trunk protection nodes to exchange necessary control messages.

Method to Resolve Conflict Among Protected Transmit Links

Figure 6:
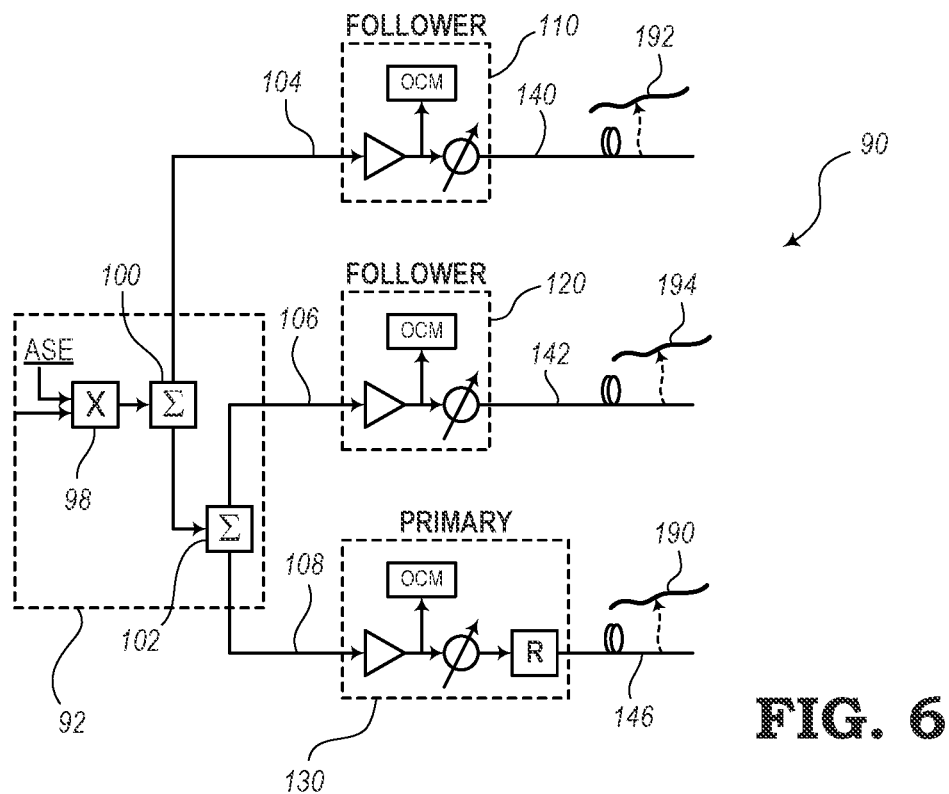
FIG. 6 shows a portion of the OMS 90 of FIG. 5, including the head-end node and first, second, and third line-mux controllers, according to various embodiments of the present disclosure.

FIG. 6 shows a portion of the OMS 90 of FIG. 5, including the head-end node 92 and first, second, and third line-mux controllers 110, 120, 130. In this example, the third path 108 is selected as a "primary" path, which may be based on certain characteristics. For example, the path (or protection link) with the highest path loss may be considered or selected as the primary link. The remaining paths (i.e., paths 104, 106) may then be considered as one or more follower paths (or secondary paths), each of which will follow the primary path as appropriate and according to the specific individual characteristics of each respective secondary path. In this case, the third path 108 is selected as the primary link, which can then be used to derive a launch profile 190 at a first stage. The secondary paths are then processed in subsequent stages, dependent on the primary link but also based on the characteristics of each independent secondary path. The launch spectral-shape 190 is copied from the primary protection link and is then utilized by the remaining follower (secondary) links. However, the actual total launch power may be determined based on the fiber type and fiber loss of the secondary paths 104, 106.

In the trunk protection links, the line-mux controllers 110, 120, 130 are configured after the section-mux 98. Each line-mux controller is configured as a control device that receives a common spectrum-profile from the section-mux 98. However, each of the line-mux controllers 110, 120, 130 may not simply derive their target launch profile on their own, since this may impact the receiving spectrum at the downstream tail-end node 94 and since only one route is selected at the tail-end node 94 by the combination of trunk switches 180, 182. The present disclosure is configured to ensure that the launch profile (or spectrum-shape) 190 remains the same among all trunk protection line-mux controllers 110, 120, 130, although the total launch power going to their respective fiber span can be different from each other.

In this one embodiment, one of the line-mux controllers (i.e., line-mux controller 130) is considered as the primary and is configured to derive the expected launch power profile 190 to the fiber, while all the other protection line-mux controllers (i.e., line mux controllers 110, 120) are considered as "followers" that follows the launch spectral-shape 190 derived at the primary. At the primary line-mux controller 130, the launch power profile 190 can be automatically derived based on its own local configuration (e.g., fiber type, fiber loss, possibility of Raman amplification, etc.) or can be externally provisioned by user, Software-Defined Networking (SDN) controller, or other suitable management or control device.

Note, the "follower" protection line-mux controllers 110, 120 maintain only launch profile spectral-shapes 192, 194, respectively, from the primary link, but the total launch power going to their fiber span is derived as a function of their own fiber type, Raman presence, fiber loss, etc., which can be different from the primary.

For deriving the primary transmit link, reference is made again to FIG. 6. The protection link with the highest path loss may be considered for candidacy as the primary link to derive the launch profile first. Then, the launch spectral-shape 190 is copied from the primary protection link to all the follower links, although the actual total launch power may be determined based on fiber type and fiber loss.

In one embodiment, the fiber link with the highest path loss (e.g., TPS Intermediate Loss (IL)+excess fiber patch cord losses) between the section-mux out to a booster input (at paths 104, 106, 108) is considered as the primary link in order to better share the dynamic range for gain/loss between the section-mux Wavelength Selective Switch (WSS) and the booster amp (e.g., plus VOA, if applicable).

If the plurality of protection links comes up with the same path loss, then the primary route is selected based on TPS switch positions at local Rx direction (reverse direction). This may be based on an assumption that the TPS switch positions at Rx direction remain synchronized with the far end. Also, this allows the primary nodal link at transmit to be consistent with the primary nodal link at the far-end pre-amp location (before section-demux).

In an embodiment, it is also possible to select a protection link with the lowest path-loss as the primary-link, in which case followers will adjust their amplifier gains accordingly. One key point in this respect is that the line-mux node designated as primary is calibrated first with optical input from section-mux to achieve its launch profile, and then the rest of the follower line-mux nodes are calibrated in parallel.

Figure 7:
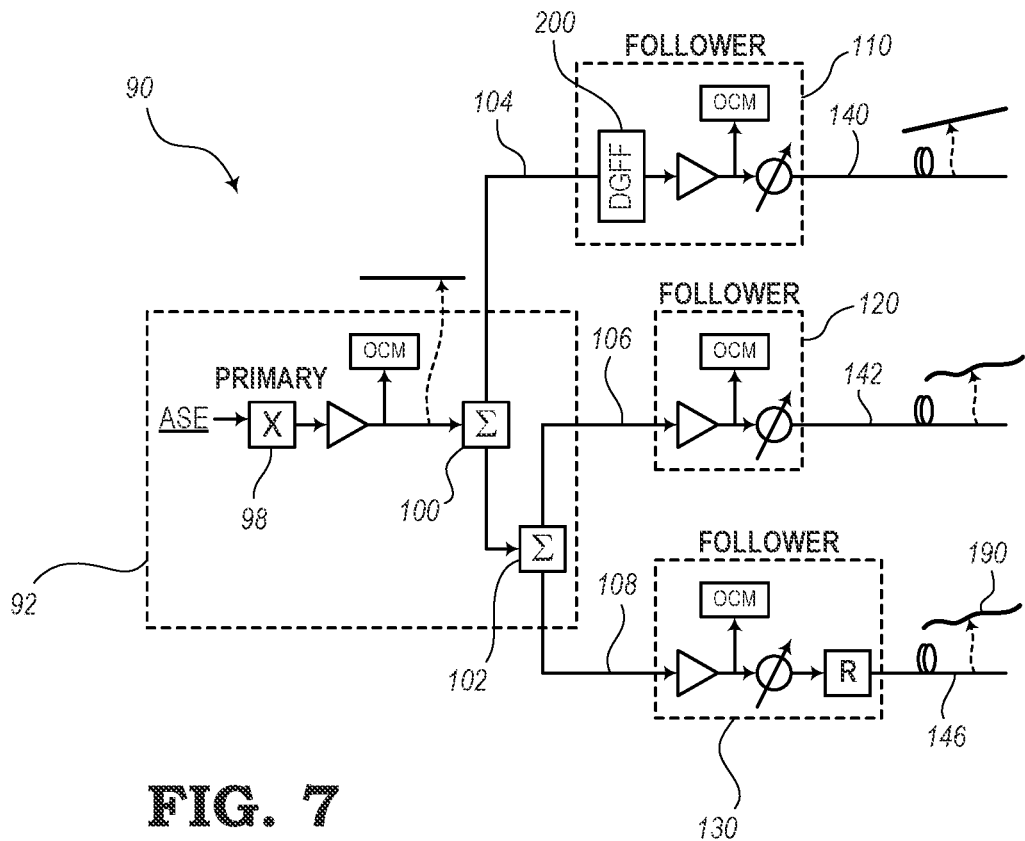
FIG. 7 shows the node and line-mux controllers of the OMS of FIG. 5, according to various embodiments of the present disclosure.

FIG. 7 shows the node 92 and line-mux controllers 110, 120, 130 of the OMS 90. Ripples from the launch profile 190 can be taken out at the line-mux controller 110 by using a Dynamic Gain Flattening Function (DGFF) component 200.

In one implementation, it is possible to designate the upstream section-mux 92 or the line-pre-amp or line-mux controller 1330 (e.g., in the case of an ILA site) as the "primary." As such, the primary functional-group may be configured to know the output is going to a TPS Tx, and will then set gain/loss actuators to achieve a target spectrum profile set at its output. Also, each of the line-mux groups connected with TPS Tx acts as a "follower" and triggers their own calibration only when the upstream primary is locally-calibrated. In one implementation, at least one of the protected line-mux groups can contain DGFF functionality (e.g., using DGFF component 200), which can take out any ripples introduced by the amplifier function.

Method to Resolve Conflicts with TPS for Receiving Spectrum

Figure 8:
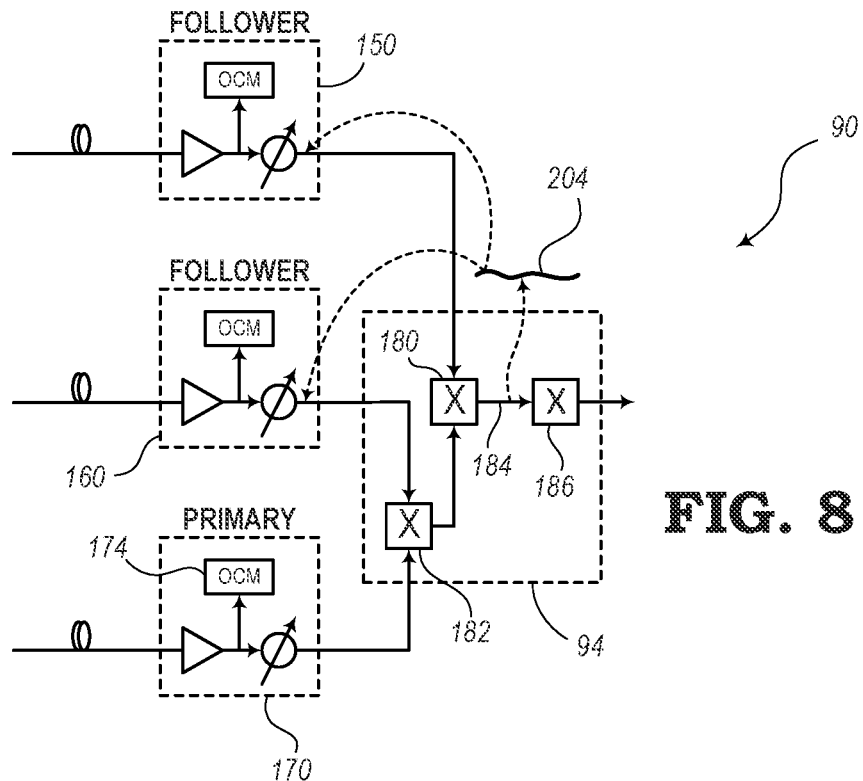
FIG. 8 shows a portion of the OMS of FIG. 5 including the line-demux controllers and the tail-end node, according to various embodiments of the present disclosure.

FIG. 8 shows a portion of the OMS 90 including the line-demux controllers 150, 160, 170 and the tail-end node 94. OCM data is obtained by the OCM 174 and a baseline profile is scaled from local OCM data, which considers TPS insertion loss and all patch-cord losses. The target output profile 204 for each follower is derived by scaling the snapshot (baseline) profile saved by the primary line-demux controller 170 at the input 184 of the section-demux 186.

One of the issues with conventional TPSs at the receiving end is that if the upstream fiber-link losses or fiber types or amplification configurations are different, then the receiving spectrum profile at the section-demux input changes every time a protection switch takes place. This generates power offset issues for downstream express mux locations or at the modem receivers (Rx). Nevertheless, in order to make sure that the receiving spectrum remains uninterrupted, the embodiments of the present disclosure provide TPSs configured to align demux path losses among all protected links, irrespective of TPS cascades.

In some embodiments, the fiber link with the highest path loss (e.g., equal to the TPS IL+excess fiber patch cord losses) between the pre-amplifier out to the section-demux input is considered as the primary line-demux. In this case, the primary line-demux is calibrated first following the completion of its upstream node calibration. Then, the switch controlling unit 74 is configured to save a snapshot of calibrated output spectrum-power profile (e.g., in database 70) scaled at the input of the section-demux 186 (e.g., as a baseline). Then, each of the "follower" line-demux controllers 150, 160, 170 is configured to derive a target output power profile from the primary-calibrated baseline and finish their own calibration (e.g., adjust amp-gain, increase VOA target-loss, sets DGFF attenuation) following their upstream node calibration in order to achieve their respective target.

Figure 9:
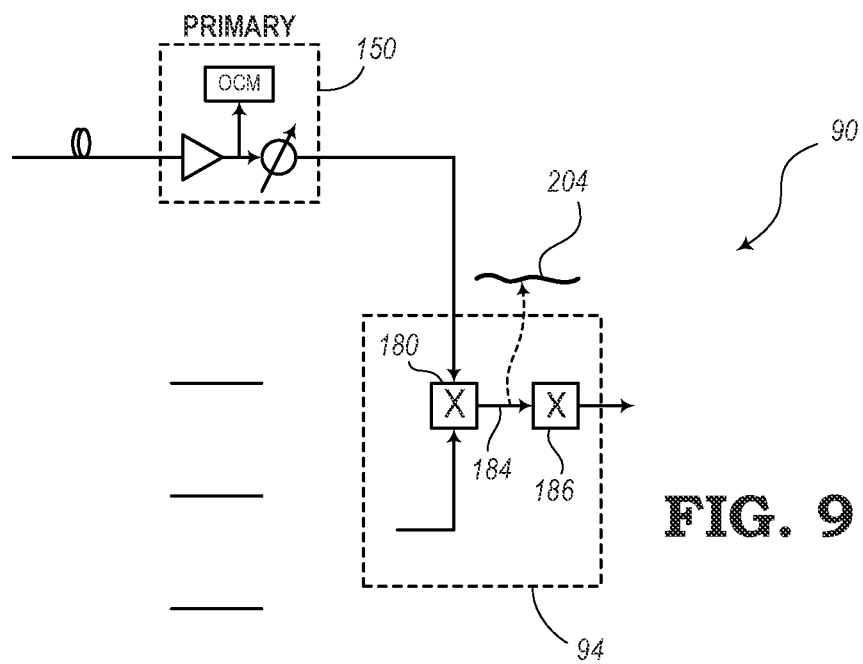
FIG. 9 is a diagram showing a portion of an early edition of a network or OMS before the network is scaled up, according to various embodiments of the present disclosure.

FIG. 9 is a diagram showing a portion of an early edition of a network 210 or OMS 90 before the network 210 is scaled up. In this example, the switch controlling unit 74 may be configured to store an "expected-max-demux-path-loss," which can be configured for the primary controller to take into account for future path loss extension.

For example, it is possible that not all the protection routes are deployed in the network 210 on day 1. In this example, the primary line-demux is selected based on deployed configurations. To support future extension on demux path losses, the expected-max-demux-path-loss parameter is added that can be configured by a planner (e.g., network manager) before nodal calibration. The primary line-demux controller takes the expected-max-demux-path-loss parameter into account while adjusting pre-amp gain and VOA target losses. The switch controlling unit 74 may be configured to perform steps to allow future seamless extension of trunk protection routes without interrupting traffic or any further spectrum adjustments on the primary route.

Figure 10:
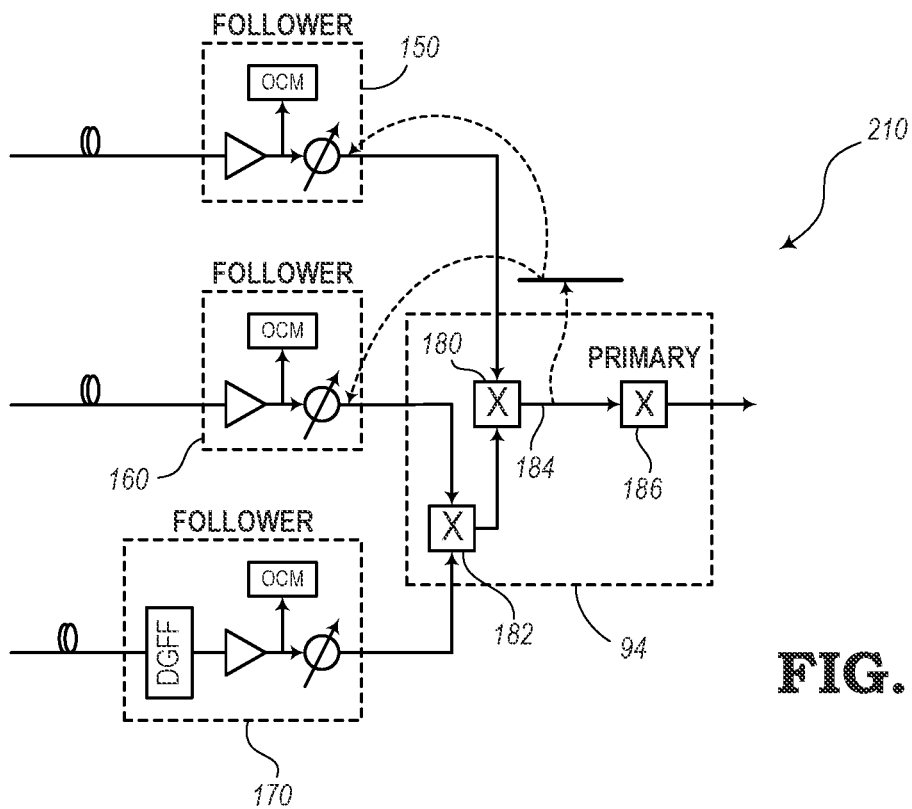
FIG. 10 shows the network or OMS of FIG. 5, where the expected profile is scaled from a primary input considering TPS insertion loss and all patch-cord losses, according to various embodiments of the present disclosure.

FIG. 10 shows the network 210 (or OMS 90), where the expected profile is scaled from a primary input considering TPS insertion loss and all patch-cord losses. In one implementation, the primary designation is moved to the downstream section-demux 186 or to a downstream line-booster location (e.g., in the case of an ILA site), wherein the primary functional-group knows the input coming from a TPS Rx port, and sets an expected spectrum power profile at its input. Each of the follower line-demux functional-groups may be configured to a) know the output connected to TPS Rx, b) derive its target launch profile scaled from the expected input profile from the primary, and c) set gain/loss/tilt actuator values to achieve the target profile.

In one implementation, at least one of the line-demux configurations can contain a DGFF component for DGFF functionality that allows taking out the incoming spectrum-ripples to meet the target launch profiles at the output. This may resolve future extension and scalability issues by selecting an expected input profile low enough that can remain achievable with future TPS cascades.

Figure 11:
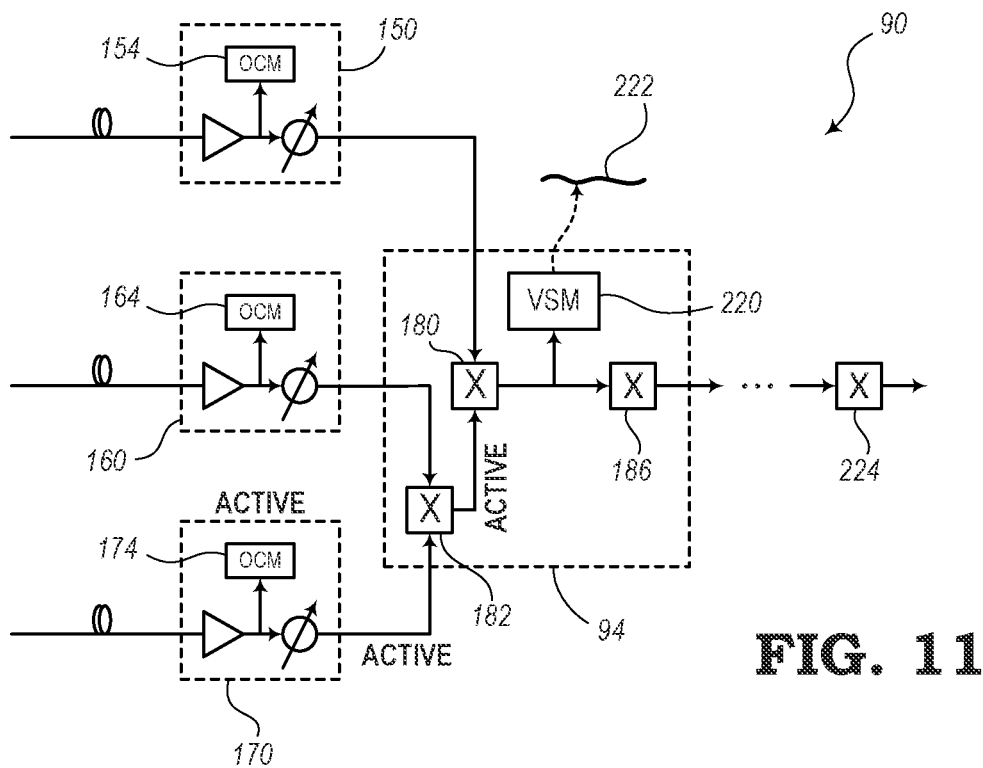
FIG. 11 shows another example of the line-demux controllers of the OMS of FIG. 5, according to various embodiments of the present disclosure.

FIG. 11 shows another example of the line-demux controllers 150, 160, 170 of the OMS 90 in one embodiment. In this embodiment, the tail-end node 94 is arranged with a virtual spectrum monitor 220. The measured spectrum 222 derived from the active link considers TPS switch positions.

In this configuration, it is possible that spectrum measuring OCMs are located at the output of each pre-amplifiers or after their VOAs and no OCMs are located at the input or output of the section-demux. The absence of real-time spectrum measurement at section-demux input may bring a challenge for close-loop loss controllers running at the section-demux 186 or at the next section-mux 224 for any express channels. At any given time, it is possible that all the protection links are non-faulted and have valid spectrum power measurements on their own OCM, where the measurements may be different from each other.

To resolve the issue of different measurements at different OCMs, the virtual spectrum monitor 220 may be arranged at the input of the section-demux 186. The virtual spectrum monitor 220 may be configured to consider the fact that with trunk protection routes (e.g., switched at Rx), only one line-demux controller 150, 160, 170 can remain optically connected to the section-demux 186 at any given time. Also, the virtual spectrum monitor 220 may be configured to derive a measured spectrum profile from the OCM 154, 164, 174 of each of the line-demux controllers 150, 160, 170, respectively, considering the associated TPS switch locations. According to some embodiments involving software applications, the virtual spectrum monitor 220 may be configured to provide real-time measured spectrum from the active path. This may avoid the need for additional OCM hardware at section-demux locations.

Figure 12:
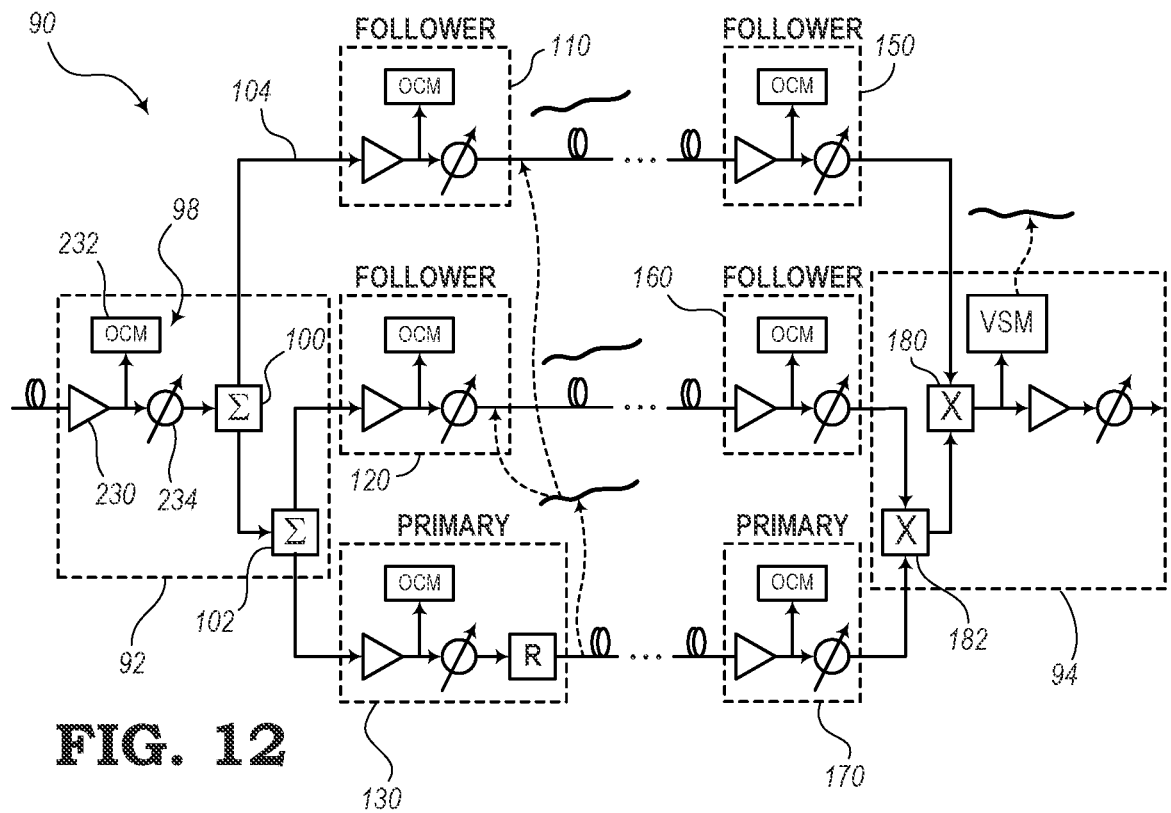
FIG. 12 shows another embodiment of the OMS of FIG. 5, according to various embodiments of the present disclosure.

FIG. 12 shows another embodiments of the OMS 90. In this example, the present disclosure is configured to perform methods that may be equally applicable for trunk protection against ROADM (e.g., using OMS links) or ILA sites (e.g., fanning out in the middle of the OMS 90).

It may be noted, for example, that the ASE loading from the section mux 98 may use a source to calibrate the link components. As illustrated, the section mux 98 may include an amplifier 230, OCM 232, and attenuator 234, for providing a path to switches (e.g., TPSs 100, 102). Without ASE loading, it would be possible to use other means of optical sources as well (such as distributed signals across the spectrum, or pilot-tones) that can broadcast from transmit end and provide stable power source to configure the optical components along the line.

ILA Implementation

Figure 13:
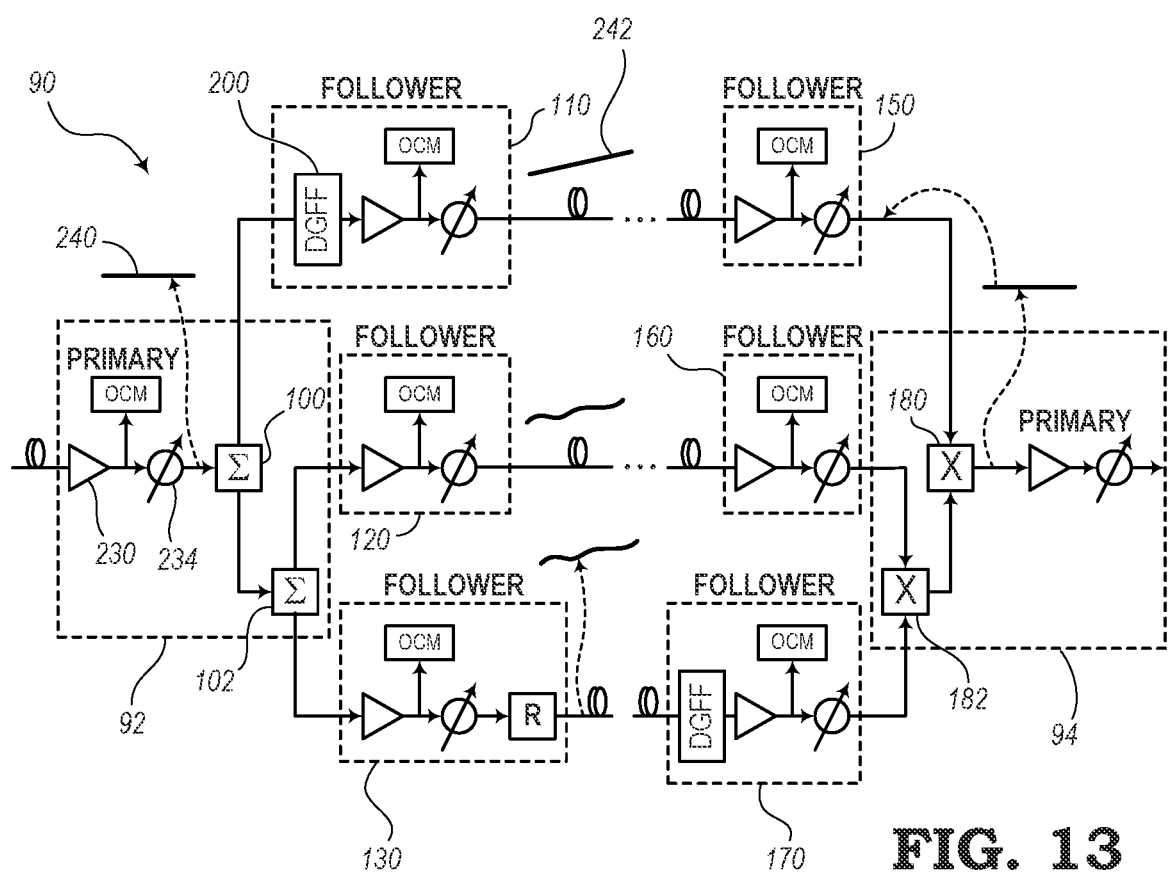
FIG. 13 shows the OMS of FIG. 5, where the attenuator of the head-end node provides a target, according to various embodiments of the present disclosure.

FIG. 13 shows the OMS 90, where the attenuator 234 of the head-end node 92 provides a target 240. The line-mux controllers 110, 120, 130 may be configured as line-boosters. The first line-booster 110 may include the DGFF component 200 (FIG. 7) for providing a flattened signal 242. The section mux 98 at the head-end node 92 and the section demux 186 at the tail-end node 94 are each configured with an amplifier, OCM, and attenuator. Also, the section mux 98 and section demux 186 are selected as primaries, while the line-mux controllers 110, 120, 130 (e.g., line-boosters) and line-demux controllers 150, 160, 170 (e.g., line pre-amps) are designated as followers.

Keeping Track of Fiber Losses Across the TPS Modules

Figure 14:
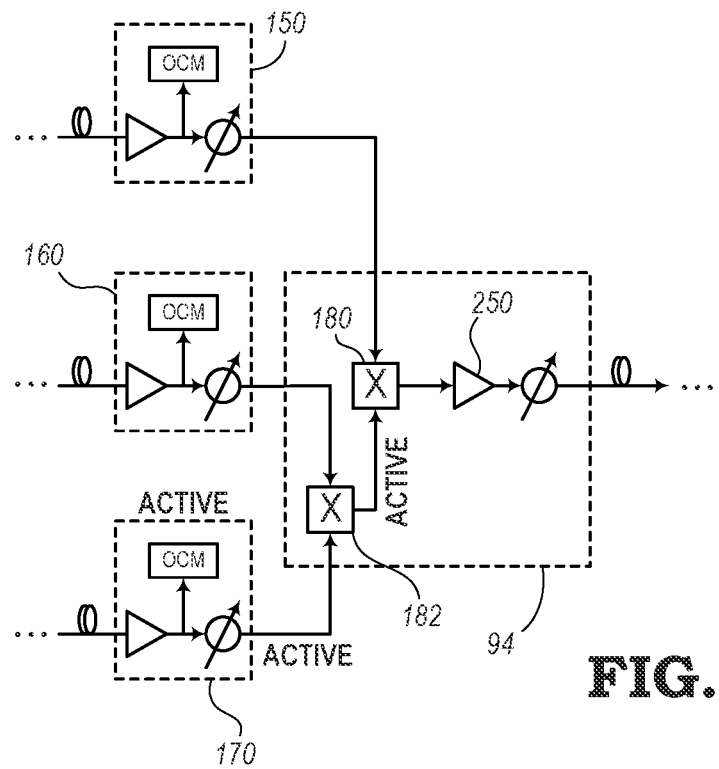
FIG. 14 shows the line pre-amps or line-demux controllers and tail-end node of the OMS of FIG. 5, according to various embodiments of the present disclosure.

FIG. 14 shows the line pre-amps (e.g., line-demux controllers 150, 160, 170) and tail-end node 94 of the OMS 90. The tail-end node 94 may include a line booster 250. In this example, the third line pre-amp (e.g., line-demux controller 170) may include the active path through the TPS 182 and TPS 180 to the line booster 250.

Figure 15:
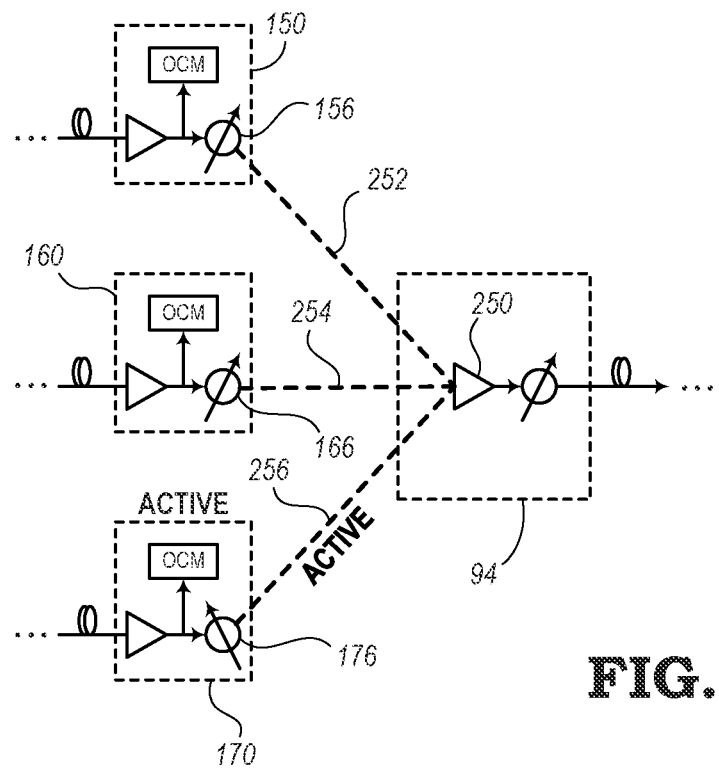
FIG. 15 shows the OMS of FIG. 5 where the various paths from the line pre-amps are connected to the line booster through a first logical-fiber-link, a second logical-fiber-link, and a third logical-fiber-link, according to various embodiments of the present disclosure.

FIG. 15 shows the OMS 90 where the various paths from the line pre-amps are connected to the line booster 250 through a first logical-fiber-link 252, a second logical-fiber-link 254, and a third logical-fiber-link 256. In this embodiments, protection switches may be modeled in software (e.g., by the switch controlling unit 74 as logical-fiber-links 252, 254, 256, where only one fiber link remains active at any given time, knowing the TPS active switch locations.

In this technique, the switch controlling unit 74 may be configured to take a baseline at a calibration time for each logical-fiber-link 252, 254, 256 by changing the TPS switch locations to different protected links and taking a measured fiber loss snapshot (also known as calibrated baselined) from an output of pre-amplifier VOAs (e.g., the VOAs 156, 166, 176) to the input of the line booster 250. This allows the downstream amp controller (e.g., running at the line-booster 250) to keep track of fiber loss changes (e.g., stored in database 70) on the active path across the TPS modules, and compensates accordingly, following the completion of initial calibration.

Further Benefits

The systems and methods of the present disclosure may be configured to establish a control sequence among trunk protection nodal elements within the OMS 90, considering auto-configuration as an example. Similar methods can be generalized for any OMS level optimization mechanisms for a given direction, where nodal actuator settings may be adjusted sequentially from one span to a plurality of downstream protected spans.

Figure 16:
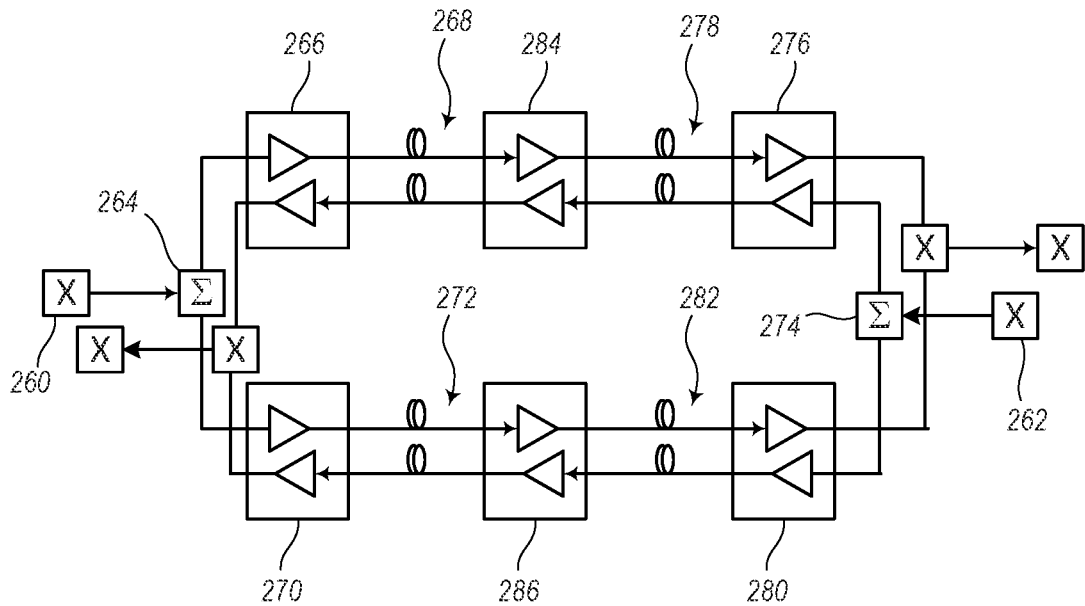
FIG. 16 shows one use case for handling calibration over TPS protection fiber links, according to various embodiments of the present disclosure.

FIG. 16 shows one use case for handling calibration over TPS protection fiber links. In this example, protection fiber spans are arranged between ROADMs 260, 262 (e.g., line amplifiers). That is, a TPS 264 is placed between the ROADM 260 and a first Dual Line Amplifier (DLA) 266, which in turn is connected to a first pair of fibers 268. The TPS 264 is also placed between the ROADM 260 and a second DLA 270, which in turn is connected to a second pair of fibers 272. Also, a TPS 274 is placed between the ROADM 262 and a third DLA 276, which in turn is connected to a third pair of fibers 278. The TPS 274 is also placed between the ROADM 262 and a fourth DLA 280, which in turn is connected to a fourth pair of fibers 282. The first and third pairs of fibers 268, 278 are connected via an ILA module 284 and the second and fourth pairs of fibers 272, 282 are connected via another ILA module 286. Each of the DLAs 266, 270, 276, 280 may be a DLA with Equalization (DLE) or a DLA with Monitoring (DLM) according to various embodiments.

A potential issue in conventional systems, for example, is that, at the line amplifiers (e.g., ROADMs 260, 262), there is usually no Optical Supervisory Channel (OSC). Hence, no notification may be made for downstream span losses, which means that an automatically-triggered or manually-triggered calibration will never run. Thus, the conventional systems would not have OSC for the first DLAs 266, 270 and span loss notification will not be received from upstream. The same is true for the last DLAs 276, 280, where there will be no downstream span loss notification.

However, according to the implementations of the present disclosure, OSC may be utilized in some cases. Input and output power profiles for muxes and demuxes, gain, and other parameters may be set manually and may include a target for a flat output power profile, where any gain, tilt, and/or VOA settings may be unnecessary. ASE channel holders at the ROADMs 260, 262 may be turned manually to trigger a manual calibration at the first DLAs 266, 270 near the first node (e.g., at the ROADM 260).

In some embodiments, software may be provided (e.g., in switching controlling unit 74), whereby a switch may be required at the mux of ROADM 260 to force turn-up ASE channel holders to their target power profile, irrespective of calibration. A DLA Pulsed Field Gradient (PFG) may be configured as a "head-end terminal" vs a "tail-end terminal." Configuring such should allow a DLA node to be autocalibrated without any token from upstream or without any upstream (e.g., head-end) or downstream (e.g., tail-end) span loss notification.

Logical-Controller-Boundaries: Back-to-Back TPS Config

Figure 17:
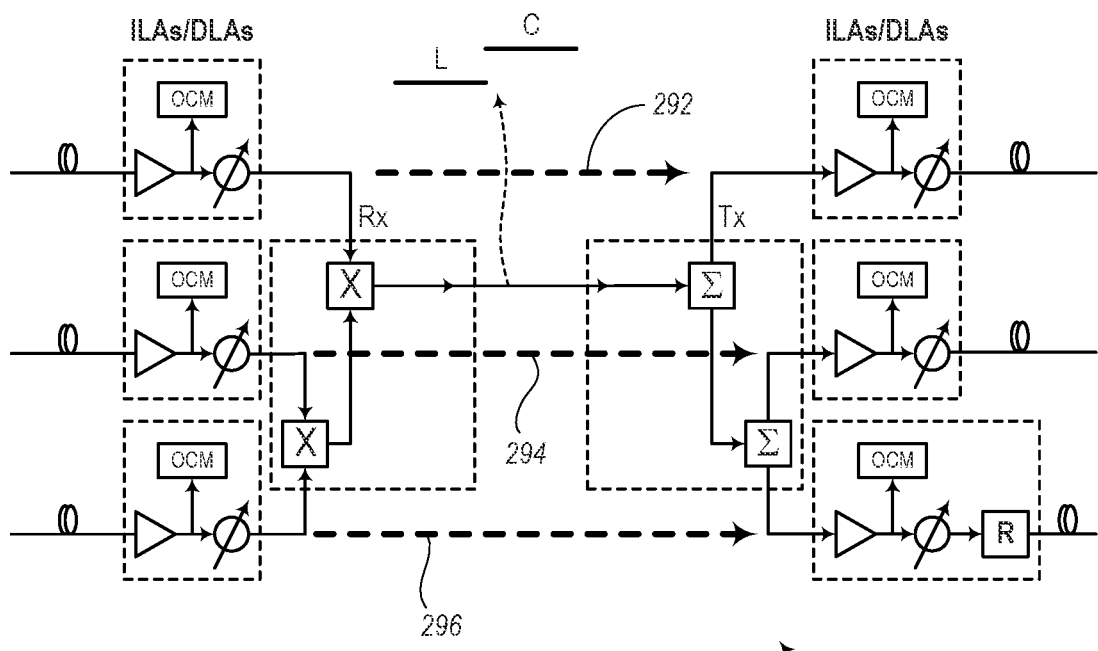
FIG. 17 is a portion of network including back-to-back TPSs connected via logical line fibers, according to various embodiments of the present disclosure.

FIG. 17 is a portion of network 290 include back-to-back TPSs connected via logical line fibers 292, 294, 296. Primary controllers set a target at a logical boundary-out location of a TPS block. All the follower upstream protection link controllers try to achieve that target on their own. Controllers on this protection group may be configured to start a calibration action when the upstream "active" controller is done with its calibration or optimization actions.

Figure 18:
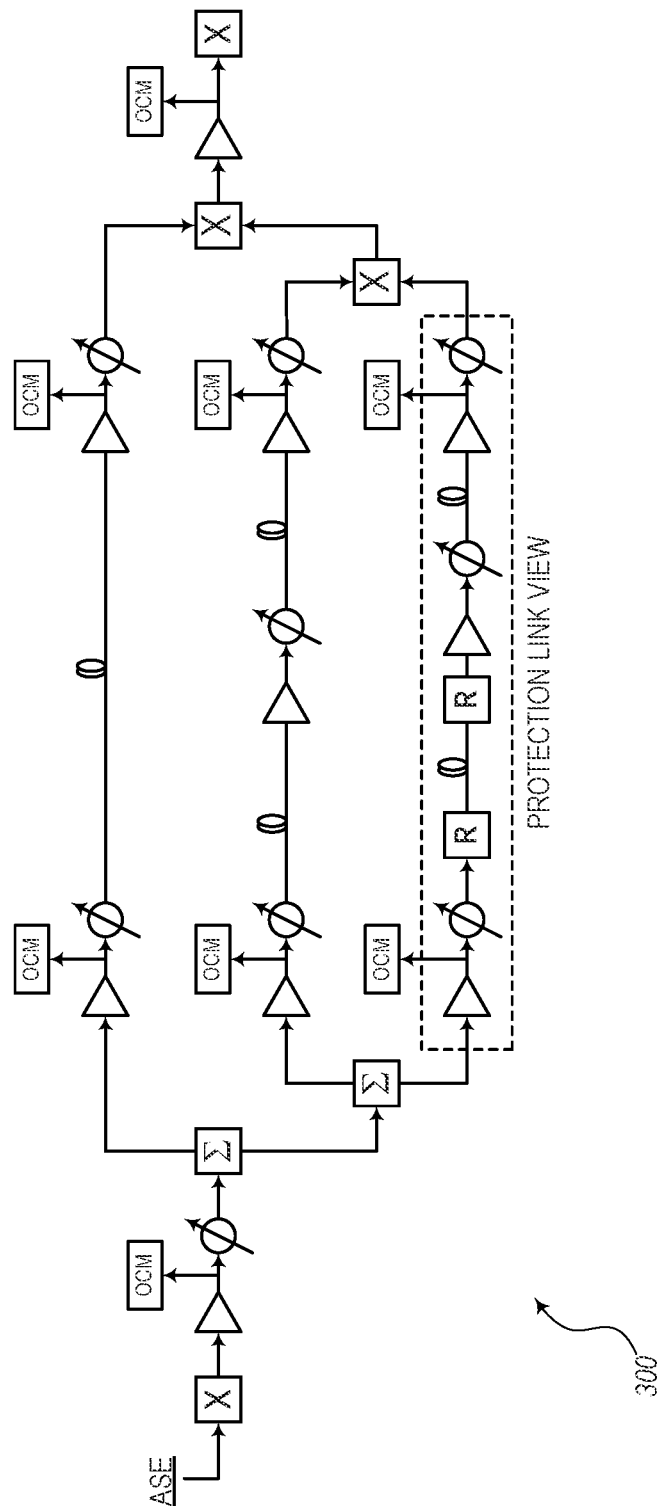
FIG. 18 shows a portion of a network, providing a use case for protection link calibration, according to various embodiments of the present disclosure.

FIG. 18 shows a portion of network 300, providing an example of a use case for protection link calibration. For example, a non-active protection link may need to be reconfigured and/or recalibrated, without interrupting any traffic or configuration on an active protected path. In such case, a controller action (e.g., for calibration, recalibration, optimization, etc.) can be triggered on any of the local-controllers on the non-active protected links that will automatically sequence actions from one node to the next, as long as the primary or active path remains calibrated.

The embodiments of the present disclosure are therefore configured to provide an improvement over conventional systems. For example, the systems and methods described herein introduce the concept of auto-negotiating primary instances for automatic configurations in a distributed trunk protection setup. The systems and methods may be applicable to distributed negotiating systems, where each follower acts independently of other followers and can configure itself in parallel. An advantage is that this enables a highly scalable solution for ROADM and/or ILA sites. Also, the embodiments of the present disclosure are configured to negotiate primary vs follower instances based on internal path losses, which differs from conventional systems.

Furthermore, the systems and methods of the present disclosure are configured to follow the launch "spectrum-shape" from the primary link, while adjusting the total launch power based on the merit of local fiber plant and configurations. The present embodiments are configured to maintain the same demux path loss between the output of the pre-amp and the input of the section-demux (or between the output of the line-pre-amp and the input of the line-booster). This allows receiving similar spectrum power, regardless of active protection routes. Also, the present systems and methods are configured for compensating fiber losses across the TPS links following initial calibration completion, which can be done by modeling TPS (or cascaded TPS modules) as logical fiber links and tracking the fiber loss changes over the modules for further compensation (e.g., using any module insertion-loss degrade, fiber pinches/releases, etc.). Also, for TPS-based trunk protection solutions, the systems and methods may be deployed in both submarine and terrestrial applications. The embodiments herein allow TPS network solutions to auto-configure the trunk protection routes and provide cascaded trunk protection ability at OMS or at per span level. It may be noted that some sensitive spans may require more protection than others.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
   a processing device, and
   a memory device configured to store a computer program having instructions that, when executed, enable the processing device to
   identify one or more control conflicts among a plurality of Network Elements (NEs) in an Optical Multiplex Section (OMS) having a plurality of trunk protection links arranged in parallel and a plurality of Trunk Protection Switches (TPSs), the trunk protection links and TPSs configured to create a distributed 1:N trunk protection arrangement, and
   resolve the one or more control conflicts by auto-negotiating a primary instance associated with enabling a first set of control actions to be conducted along a primary path in the OMS and auto-negotiating one or more follower instances associated with enabling a second set of control actions to be conducted along one or more secondary paths in the OMS subsequent to the first set of control actions.

2. The system of claim 1, wherein the one or more control conflicts are identified during an auto-configuration procedure.

3. The system of claim 1, wherein the primary instance and the one or more follower instances are configured to define a control sequence among the plurality of trunk protection links to ensure that power received at a tail-end of the plurality of trunk protection links substantially consistent and that a link budget remains uninterrupted following a protection-switch operation.

4. The system of claim 1, wherein the instructions are further configured to enable the processing device to auto-negotiate the primary instance and the one or more follower instances based on path losses respectively related to one or more multiplexers and demultiplexer associated with the primary path and one or more secondary paths.

5. The system of claim 1, wherein the instructions are further configured to enable the processing device to auto-negotiate the primary instance and the one or more follower instances based on an output destined to be provided to a transmitter of a respective TPS or an input destined to be received from a receiver of a respective TPS.

6. The system of claim 1, wherein the OMS includes a plurality of secondary paths related to a plurality of follower instances for enabling the second set of control actions, and wherein the instructions are further configured to enable the processing device to independently auto-negotiate the plurality of follower instances for each secondary path based on the configuration of each secondary path.

7. The system of claim 6, wherein independently auto-negotiating the plurality of follower instances includes maintaining the substantially same received spectrum-power profile regardless of protection-switches to any of the secondary path.

8. The system of claim 7, wherein the instructions further enable the processing device to compensate for fiber losses across the primary path and secondary paths by modeling the trunk protection links as logical fiber links and tracking fiber loss changes.

9. The system of claim 1, wherein auto-negotiating the one or more follower instances includes following a launch spectrum power profile shape associated with the primary instance.

10. The system of claim 1, wherein auto-negotiating the one or more follower instances further includes adjusting a total launch power associated with each of the one or more secondary paths.

11. The system of claim 1, wherein auto-negotiating the one or more follower instances further includes deriving a launch power profile based on one or more of fiber type, fiber loss, and presence or absence of Raman amplification on the respective secondary path.

12. The system of claim 1, wherein the instructions further enable the processing device to broadcast control messages from a first node at a head-end of the OMS and to receive the control messages by a selective switch at a second node at a tail-end of the OMS.

13. The system of claim 1, wherein the primary path and one or more secondary paths include one or more of different numbers of fiber spans, different fiber types, different Intermediate Line Amplifiers (ILAs), different Raman amplification strategies, different Amplified Spontaneous Emission (ASE) amplification strategies, and different fiber losses.

14. The system of claim 1, wherein at least one of the primary path and one or more secondary paths includes a Dynamic Gain Flattening Function (DGFF) to reduce ripples introduced by an associated amplifier in order to meet a target launch profile.

15. The system of claim 1, wherein auto-negotiating the one or more follower instances includes setting one or more of a gain actuator, loss actuator, and tilt actuator to achieve a target launch profile to a fiber span or to achieve target spectrum-power profile at the tail-end of protection-links.

16. A non-transitory computer-readable medium configured to store computer logic having instructions that, when executed, cause one or more processing devices to:
identify one or more control-action conflicts among a plurality of Network Elements (NEs) in an Optical Multiplex Section (OMS) having a plurality of trunk protection links arranged in parallel and a plurality of Trunk Protection Switches (TPSs), the trunk protection links and TPSs configured to create a distributed 1:N trunk protection arrangement, and
resolve the one or more control conflicts by auto-negotiating a primary instance associated with enabling a first set of control actions to be conducted along a primary path in the OMS and auto-negotiating one or more follower instances associated with enabling a second set of control actions to be conducted along one or more secondary paths in the OMS subsequent to the first set of control actions.

17. The non-transitory computer-readable medium of claim 16, wherein the primary instance and the one or more follower instances are configured to define a control sequence among the plurality of trunk protection links to ensure that power received at a tail-end of the OMS is substantially consistent and that a link budget remains uninterrupted.

18. The non-transitory computer-readable medium of claim 16, wherein the instructions are further configured to enable the processing device to auto-negotiate the primary instance and the one or more follower instances based on one or more of: a) path losses respectively related to one or more multiplexers and demultiplexer associated with the primary path and one or more secondary paths, and b) an output destined to be provided to a transmitter of a respective TPD or an input destined to be received from a receiver of a respective TPS.

19. A method comprising the steps of:
identifying one or more control conflicts among a plurality of Network Elements (NEs) in an Optical Multiplex Section (OMS) having a plurality of trunk protection links arranged in parallel and a plurality of Trunk Protection Switches (TPSs), the trunk protection links and TPSs configured to create a distributed 1:N trunk protection arrangement, and
resolving the one or more control conflicts by auto-negotiating a primary instance associated with enabling a first set of control actions to be conducted along a primary path in the OMS and auto-negotiating one or more follower instances associated with enabling a second set of control actions to be conducted along one or more secondary paths in the OMS subsequent to the first set of control actions.

20. The method of claim 19, wherein the OMS includes a plurality of secondary paths related to a plurality of follower instances for enabling the second set of control actions, the method further comprising the steps of:
independently auto-negotiate the plurality of follower instances for each secondary path based on the configuration of each secondary path by maintaining substantially the same path loss regardless of the secondary path, and
compensating for fiber losses across the primary path and secondary paths by modeling the trunk protection links as logical fiber links and tracking fiber loss changes.

* * * * *